United States Patent
Thenthiruperai (10) Patent No.: US 7,436,948 B1
(45) Date of Patent: Oct. 14, 2008

(54) METHOD AND SYSTEM FOR TIMED INTERACTION WITH AN INTERACTIVE VOICE RESPONSE

(75) Inventor: Balaji S. Thenthiruperai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 559 days.

(21) Appl. No.: 11/023,770

(22) Filed: Dec. 23, 2004

(51) Int. Cl.
*H04M 3/00* (2006.01)

(52) U.S. Cl. .............................. 379/266.03; 379/142.06; 704/270.1

(58) Field of Classification Search ............ 379/265.01, 379/265.07, 265.11, 266.01, 88.01, 266.07, 379/266.03, 265.14, 265.08, 142.06; 715/700, 715/88.01, 266.07; 704/270.1
See application file for complete search history.

(56) References Cited

U.S. PATENT DOCUMENTS

| | | | | |
|---|---|---|---|---|
| 5,737,393 A | * | 4/1998 | Wolf | 379/88.13 |
| 6,807,274 B2 | * | 10/2004 | Joseph et al. | 379/265.01 |
| 7,174,006 B2 | * | 2/2007 | Guedalia et al. | 379/88.13 |
| 2004/0017898 A1 | * | 1/2004 | Reynolds | 379/88.18 |
| 2004/0264667 A1 | * | 12/2004 | Horvitz et al. | 379/265.02 |
| 2004/0264677 A1 | * | 12/2004 | Horvitz et al. | 379/265.02 |
| 2005/0081152 A1 | * | 4/2005 | Commarford et al. | 715/705 |
| 2006/0115070 A1 | * | 6/2006 | Bushey et al. | 379/265.02 |

* cited by examiner

*Primary Examiner*—Olisa Anwah (57) ABSTRACT

Provided are methods and systems associated with interactive voice response ("IVR") systems that control the amount of time a user interacts with the system. According to the invention, an IVR system utilizes a timer or series of timers to determine how long a user has been interacting with the IVR system. When threshold events occur, the IVR system will analyze the status of the call and may switch the user to a predefined destination, such as to an operator queue, directly to a live operator, or to another designated navigation point in the IVR navigation structure. In this manner increasing the efficiency of manner in which the IVR system interacts with a caller.

19 Claims, 4 Drawing Sheets

METHOD AND SYSTEM FOR TIMED INTERACTION WITH AN INTERACTIVE VOICE RESPONSE

FIELD OF THE INVENTION

The present invention relates to telecommunications and, more particularly, to interactive voice response systems.

BACKGROUND OF THE INVENTION

Interactive voice response systems are well known and widely used today. Generally speaking, an interactive voice response ("IVR") system communicates with a user through a voice-band interface, such as a telephone connection, typically "speaking" prompts to the user and receiving user commands and other input in the form of speech or DTMF signals.

Most IVR systems include a set of logic that defines a navigation structure through which a user can navigate by providing suitable speech or DTMF commands. For instance, the logic might define a first prompt that asks a user to select from a first set of response options, and, for each response option, the logic may then define a respective second prompt that asks the user to select from a respective second set of response options, and so forth. Ultimately, the user may reach a desired point of the navigation structure, such as an information navigation point (i.e., providing the time or a weather forecast) or a telephone extension (i.e., the individual to whom the caller was trying to reach). Sometimes, however, the IVR system cannot address the callers needs and the user opts to be connected to a human operator to engage in live communication.

Unfortunately, due to poor design, system overloading, or for other reasons, a user can sometimes become stuck at one or more navigation points in an IVR navigation structure. For instance, a user may reach a part of the navigation structure that continuously shifts the user back and forth between two or more navigation points, regardless of the user's response selections. As another example, a user may reach a given navigation point that either does not prompt a user to navigate to a next point or that repeats itself regardless of the response selection made by the user. In such a situation the caller is generally left with few options except to hang up and start the process again.

SUMMARY OF THE INVENTION

The present invention provides a method and system that may help to overcome the foregoing problem. According to the invention, an IVR system will apply a timer to determine how long a user has been interacting with the IVR system. When the timer expires (and possibly based on one or more other factors as well), the IVR system will analyze the status of the call and may switch the user to a predefined destination, such as to an operator queue, directly to a live operator, or to another designated navigation point in the IVR navigation structure.

The step of applying a timer to determine how long a user has been interacting with the IVR system can involve timing how long a user has been interacting with the IVR system as a whole or a given subset of the IVR system, such as a given set of navigation points. To do this, the IVR system could be programmed with different timer values that it uses for different aspects (e.g., given navigation points or given sets of navigation points) of the navigation structure.

For instance, when the user reaches a given navigation point in the structure, the IVR system could begin decrementing a respective timer and apply that timer until the user reaches another designated navigation point in the structure. In practice, the IVR system could have a table that specifies, per navigation point (i) a timer value and (ii) one or more other navigation points that should cause the IVR system to stop applying the timer. When the user reaches a given navigation point, the IVR system can then refer to the table to determine the applicable timer value and then begin decrementing the timer. If and when the user in turn reaches one of the other specified navigation points, the IVR system could then stop decrementing the timer. However, if the timer expires before the user reaches one of the other specified navigation points, then the IVR system may responsively move the user to a predefined destination.

Alternatively, the step of applying a timer to determine how long a user has been interacting with the IVR system can involve timing how long a user has been interacting with the IVR system in a given session. For instance, when a user first calls into the IVR system, the system can start decrementing a timer. When the timer expires, the system can then responsively move the user to a predefined destination.

The timer value(s) that the IVR system applies can vary from one user to another. To accommodate this, the IVR system could include or have access to a data store that specifies what timer value(s) to use for which callers. In practice, for instance, the IVR system could identify the caller by receiving automatic number identification (ANI, also known as caller-ID) information, or by entry from the user, or in some other manner. And the IVR system could then refer to the data store to determine a service class in which the caller falls. For each navigation point in the navigation structure, the IVR system may then have different timer values for different service classes. For instance, the table described above could specify timers per service class for each navigation point.

In an exemplary embodiment, the IVR system may also apply some exceptions to the process, such as to avoid cutting off a user during a substantive interaction with the IVR system. For instance, when the timer expires, the IVR system may determine whether the user is currently engaged in substantive interaction with the IVR system. If the IVR system determines that the user is engaged in substantive interaction with the system, then the system may programmatically not move the user to the predefined destination. Alternatively, the IVR system could keep track of when the user is engaged in substantive interaction with the IVR system and could programmatically apply a timer only when the user is not engaged in substantive interaction with the IVR system.

It is an object of the present to provide an improved IVR system that reduces the possibility that a call will be stuck in the system. This improved IVR system includes a communication interface for engaging in voice-band communications with a user via a telephone connection, a data storage device for storing navigation logic and timer logic and a processor for executing the logic. The navigation logic stored in the data storage defines a navigation structure through which a call moves. This structure includes various navigation points that are accessed by providing voice-band commands to the interactive voice response system via the communication interface. The timer logic stored in the data storage is executable by a processor and determines whether the user has been interacting with the interactive voice response system for a threshold period of time. If it is determined that the threshold period of time has elapsed then the call is switched over to a predefined destination.

It is a further object of the present invention to provide a method for determining within an interactive voice response system that a user has been interacting with the interactive voice response system for a threshold period and upon reaching the end of the threshold period responsively switching the user to a predefined destination.

These as well as other aspects and advantages of the present invention will become apparent to those of ordinary skill in the art by reading the following detailed description, with appropriate reference to the accompanying drawings.

DETAILED DESCRIPTION OF AN EXEMPLARY EMBODIMENT

IVR systems are currently employed as a tool to more rapidly handle customer phone calls and thereby improve customer satisfaction. Through an IVR system more customers can be serviced in a more timely fashion with a reduction in cost and required resources. However, IVR systems can frustrate customers if they are required to spend too much time in the IVR system before reaching the desired designation. The present invention involves improved systems and methods for handling a caller that is forced to spend too much time in an IVR system. More specifically, the invention provides systems and methods employed by those systems that measure the time a caller has been interfacing with the IVR system or some portion thereof and optionally transfer that caller to a desired location, such as an operator queue, when a predetermined amount of time has passed.

Figure 1:
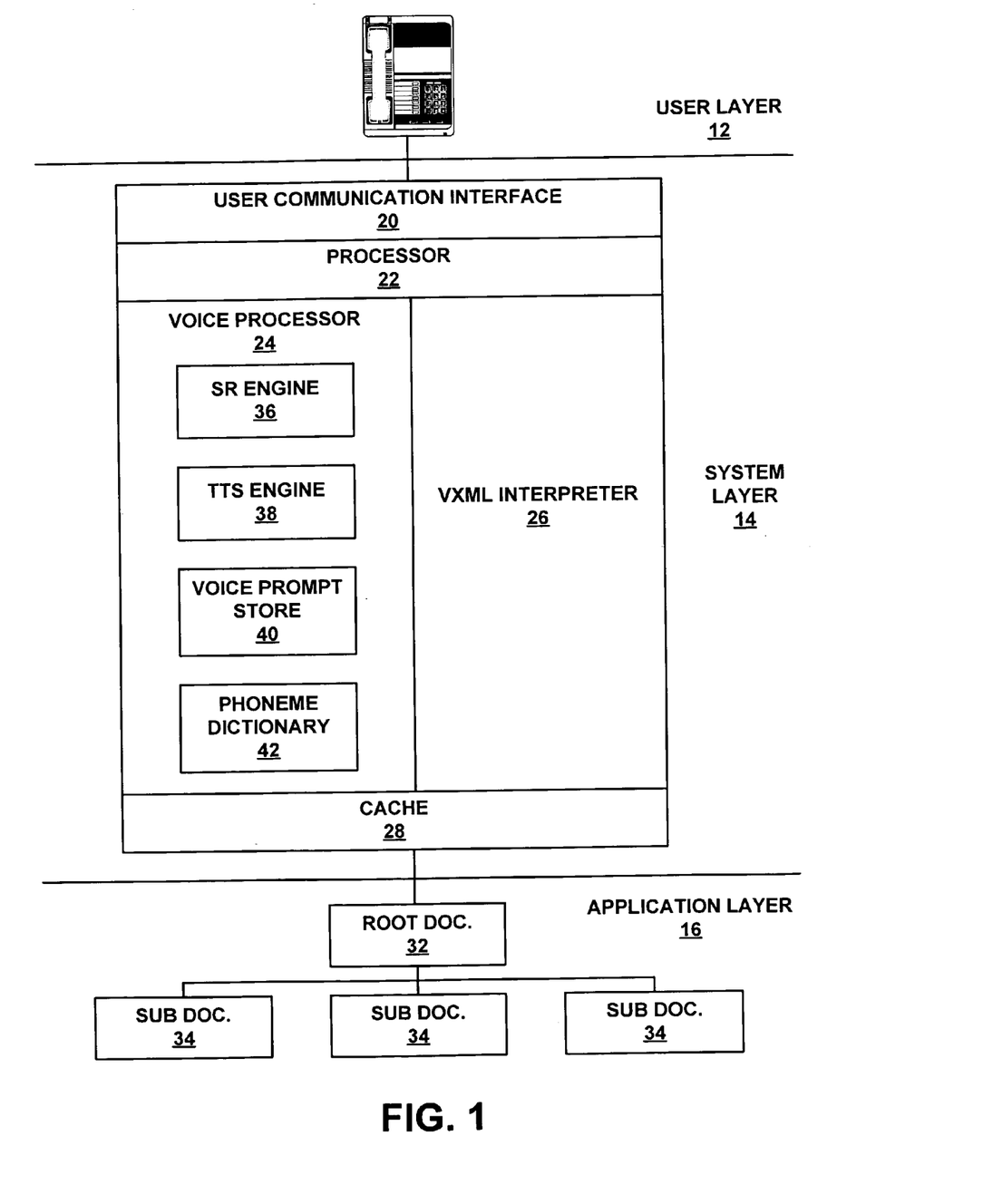
FIG. 1 is a functional block diagram illustrating the layers of a IVR system in which the invention can be employed.

Referring to the drawings, FIG. 1 is a functional block diagram illustrating a system in which an exemplary embodiment of the IVR systems of the present invention may be employed. As shown in FIG. 1, the system may be considered to include three layers, (i) a user layer 12, (ii) a platform or system layer 14, and (iii) an application layer 16. The user layer 12 provides a mechanism 18, such as a telephone, for a person to communicate by voice with the platform. The system layer, in turn, includes a user communication interface 20, a processor 22 (i.e., one or more processors), a voice-processing module 24, a VXML interpreter module 26, and cache 28. Application layer 16 then defines an application 30, which may be made up of a root document 32 and subsidiary documents 34 that can be loaded into cache 28 and executed by processor 22.

User communication interface 20 may take various forms. For example, the user communication interface can provide a circuit or packet interface with a telecommunications network (such as the PTSN or the Internet, either of which may provide connectivity to one or more users via at least one wireless communications link—such as a cellular communication system for instance). The communication interface may, in turn, include an A-D and D-A converter (not shown), for converting between analog signals on the user side and digital signals on the platform side. Processor 22 then sends and receives communications via user communication interface 20.

Voice-processing module 24 and VXML interpreter module 26 preferably define program instructions that can be executed by processor 22 and data that can be referenced by the processor 22, to carry out basic IVR system functions. All of this program logic can be stored in suitable data storage, such as ROM or a disk drive for example.

For instance, voice-processing module 24 preferably defines a speech recognition ("SR") engine 36 and a text-to-speech ("TTS") engine 38, as well as a voice prompt store 40. Further, voice-processing module 24 may include a phoneme dictionary 42 that the processor can reference to facilitate operation of the SR engine and the TTS engine. VXML interpreter module 26, in turn, may facilitate execution of application 30, such as by interpreting tags in the application.

In some applications, the system may utilize applications that are stored remotely. In such cases, a cache 28 functions to temporarily hold application 30 (or one or more documents of the application) when processor 22 is executing the application. Thus, in operation, processor 22 may retrieve application 30 from for example a designated URI on the Internet (or elsewhere) and may load the application into cache 28. The processor may then execute the application, using VXML interpreter 26, using TTS engine 38 and voice prompt store 40 to send speech to a user, and using SR engine 36 to recognize speech spoken by a user.

In practice, in the present invention, the communication interface engages in voice-band communications with a user via a telephone connection. The telephone connection can be any appropriate connection capable of carrying voice band communications, such as circuit-switched telephone connection or a packet switched telephone connection. The connection permits access to the IVR system from any telephone network capable of carrying voice band communications such as a public switched telephone network (PSTN), or cellular networks such as CDMA, and GSM networks. When the communication interface receives a call, navigation logic, stored in the data storage, controls how the call is handled. More specifically, the navigation logic defines a multi-level navigation structure through which the user can navigate to various navigation points by providing voice-band commands to the interactive voice response system via the communication interface. Timer logic is also stored in the data storage and executable by a processor 22. The timer logic is associated with the navigation logic to permit determination of whether the user has been interacting with the interactive voice response system for a threshold period of time and, as discussed more below, optionally for responsively switching the user over to a predefined destination such as a call queue for a live operator.

The communication interface 20 may provide spoken prompts with TTS engine 38 for converting digital text into outgoing digitized speech signals. An IVR system may thus specify text that represents voice prompts to be spoken to a user. When it is appropriate for the IVR system to speak such text, the system may provide the text to the TTS engine 38. The TTS engine 38 may then convert the text to an outgoing digitized speech signal, and the platform may convert the signal to analog speech and send it to the user. In converting from text to speech, the TTS engine 38 may also make use of the dictionary database of phonemes 42, so that it can piece together the words that make up the designated speech.

Also when delivering voice prompts, an IVR system may include a set of stored voice prompts, in the form of digitized audio files (e.g., *.wav files) for instance. These stored voice prompts would often be common prompts, such as "Hello", "Ready", "Please select from the following options", or the like. Each stored voice prompt might have an associated label (e.g., a filename under which the prompt is stored). By reference to the label, an IVR system might specify that a prompt should be played to a user. In such a case the audio file is retrieved, converted into an analog waveform, and sent to the user as an audible message.

The caller then either verbally responds to the prompt provided by the TTS engine 38 or if appropriate utilizes DTMF tones. This response is then processed into a digital signal by the SR engine 36 and the navigation logic directs the call either to another point within the IVR system or another desired navigation point.

As noted the navigation logic is resident on the data storage accessible by processor 24. The navigation logic can be written or rendered in any of a variety of computer languages. These applications and the documents they contain are generally in the form of voice-markup files. One language for creating these voice markup files is VoiceXML (or simply "VXML"), which is a tag-based language similar the HTML language that underlies most Internet web pages. (Other analogous languages, such as SALT, SpeechML and VoxML for instance, are available as well.) By coding navigation logic in VXML, the application can thus be made to readily access and provide web content, just as an HTML-based application can do. Further, when executed by the IVR system, the VXML application can effectively communicate with a user through speech.

An application developer can write navigation logic in VXML. When using VXML, the various levels or navigation points of the IVR may be set up as separate VXML documents designed to effectuate the function assigned that particular level or navigation point. Alternatively, an application developer can write an application in another language (such as Java, C, C++, etc.), and the content of that application can be rendered in VXML. (For instance, when the system loads an application, the system or some intermediate entity could transcode the application from its native code to VXML.) As a result, navigation logic can be customized to address the needs of each individual IVR system.

It should be understood that this and other arrangements described herein are set forth for purposes of example only. As such, those skilled in the art will appreciate that other arrangements and other elements (e.g., machines, interfaces, functions, orders and groupings of functions, etc.) can be used instead, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. For example, although the voice command system is shown to include a VXML interpreter, the system may include another type of voice browser. Alternatively, the system might not be browser-based at all. Other examples are possible as well.

IVR systems may be designed in different ways and having differing functional characteristics. The present invention is applicable to all such designs. In general, IVR systems comprise a multi-level query queue that allows the system to properly direct an incoming call. Usually when a call is received by an IVR system, the caller is met with one or more predetermined questions or prompts. As a result of the responses to these questions, the system directs the call in an appropriate manner as set forth in the navigation logic of the system. Often the call is directed to another navigation level within the IVR system, where the caller is again met with one or more questions or prompts in an effort to properly direct the call. Depending on the application, an IVR system may have several of such navigation levels. Within each of such navigation levels is generally a plurality of navigation points.

What navigation point a call is sent to is controlled by the navigation logic and the user's responses to prompts. Generally, if the IVR system is unable to fully respond the to the caller's needs, the call is directed to a live operator for further assistance.

Figure 2:
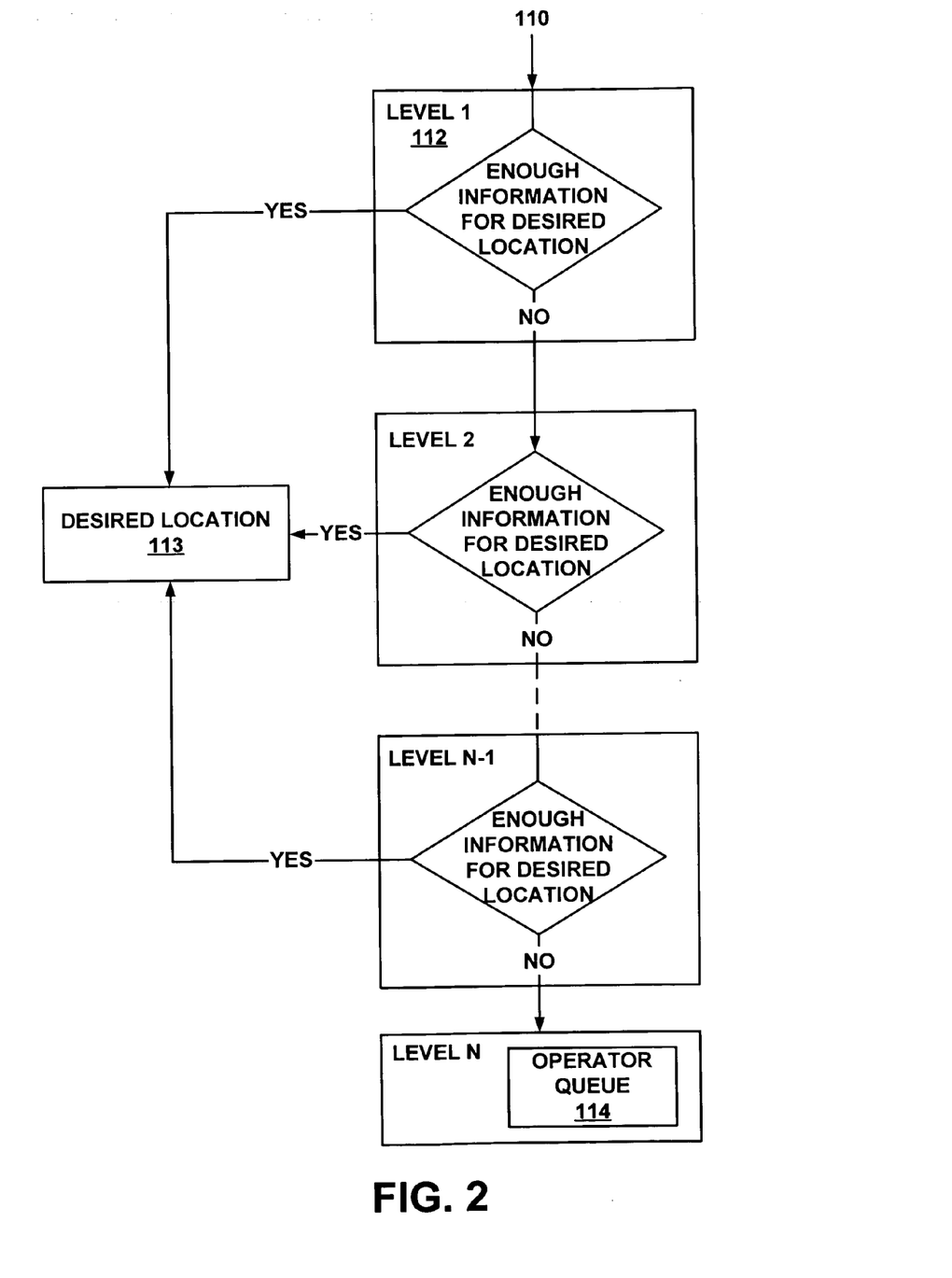
FIG. 2 is block diagram/flow chart broadly illustrating the navigation functionality of a typical IVR system.

FIG. 2 broadly illustrates the operation of a typical multi-level IVR system. As can be seen from FIG. 2, a call 110 initially interfaces with navigation level one 112 of the IVR system. The call 110 then proceeds from navigation level to navigation level until it is either directed to the desired location 113 or to a call queue 114 for a live operator. The IVR system of FIG. 2 has "n" levels associated with it. As noted above, the number of navigation levels actually present in an IVR system will vary from application to application and the amount and nature of the navigation points within any given navigation level will also be system dependent. However, in most cases, the nth or last navigation level will generally involve directing the call to a call queue 114 for a live operator.

Figure 3:
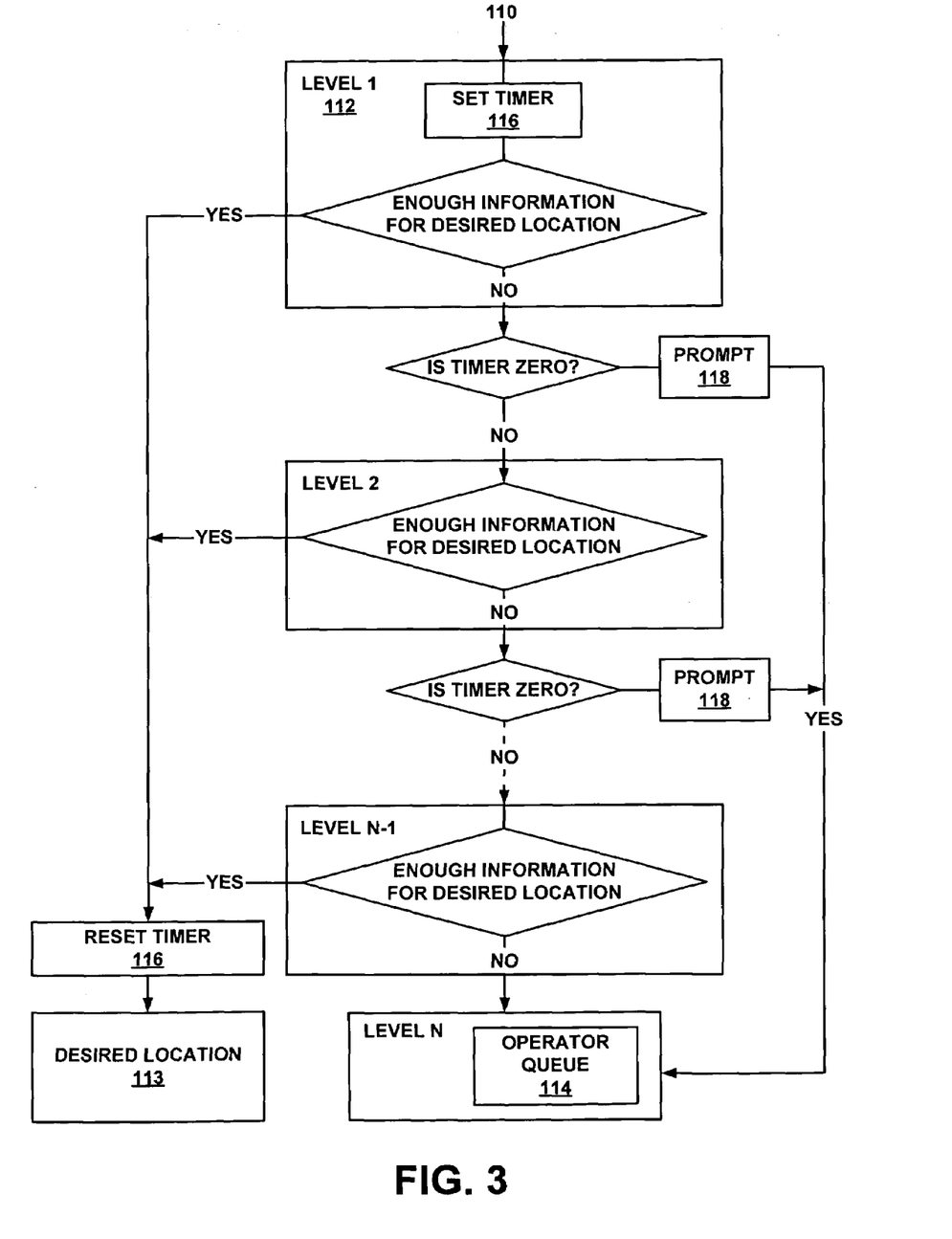
FIG. 3 is a block diagram/flow chart illustrating one embodiment of an IVR system of the present invention.

FIG. 3 illustrates how an exemplary embodiment of the present invention may interface with a typical IVR system. As shown in FIG. 3, when the call 110 is received by the first navigation level 112 of the IVR system, a timer 116 is set to a predetermined threshold amount and begins to decrement toward zero. The time on timer 116 is functionally associated with the call 110 so as to a measure of how long the call has been in the IVR system. Thus, the call 110 proceeds through the IVR system with the timer 116 decrementing in the background. If the call 110 leaves the IVR system before the timer 116 expires, then the timer 116 is reset and assigned to the next incoming call. If, however, the timer 116 expires (i.e. the timer reaches zero and the threshold time is met) before the call 110 exits the IVR system, a prompt 118 is initiated. This prompt 118 will direct the IVR system to forward the call 110 directly to the nth level 114 of the IVR system and place the call in a queue for a live operator. In this manner, the IVR system is modified to ensure that a caller gets prompt attention even in the event of a system failure due to poor programming, poor connection or system burden.

It should be noted that while FIG. 3, for clarity, illustrates a query of the status of the timer between navigation levels, in a particularly exemplary embodiment the expiration of the timer 116 may initiate prompt 118 at any point within the navigation level.

In an alternative exemplary embodiment, the prompt 118 does not automatically send the call 110 to the nth level 114 of the IVR system. Rather, the prompt 118 can initiate logic that analyzes the status of the call 110 to determine whether the there is still substantive interaction with the IVR system. This logic can be of many different varieties. For example, the prompt 118 may simply result in the IVR system asking the user if she desires to speak with a live operator or to continue with the automated system. If the caller responds in a manner that results in the call 110 remaining in the automated system then the timer 116 is reset to a second predetermined threshold level and begins to decrement again. Upon expiration of the timer 118 a second time a similar prompt 118 will result.

Alternatively, the prompt 118 may result in the execution of logic that analyzes the progress of the call 110 through the IVR system. Depending on the status of the call 110, it may be treated differently. If, for example, the call 110 is about to exit a navigation level of the IVR system, that process may be allowed to proceed. If the call 110 is then routed to a desired navigation point 113, such a as phone extension or an information navigation point, the IVR system makes no changes. However, if the call 110 is proceeding to another navigation level within the IVR system that will resulting in further prompting of the caller, then that transfer may be interrupted and the call 110 may be forwarded directly to the nth level 114 of the IVR system and placed in the call queue for a live operator.

Figure 4:
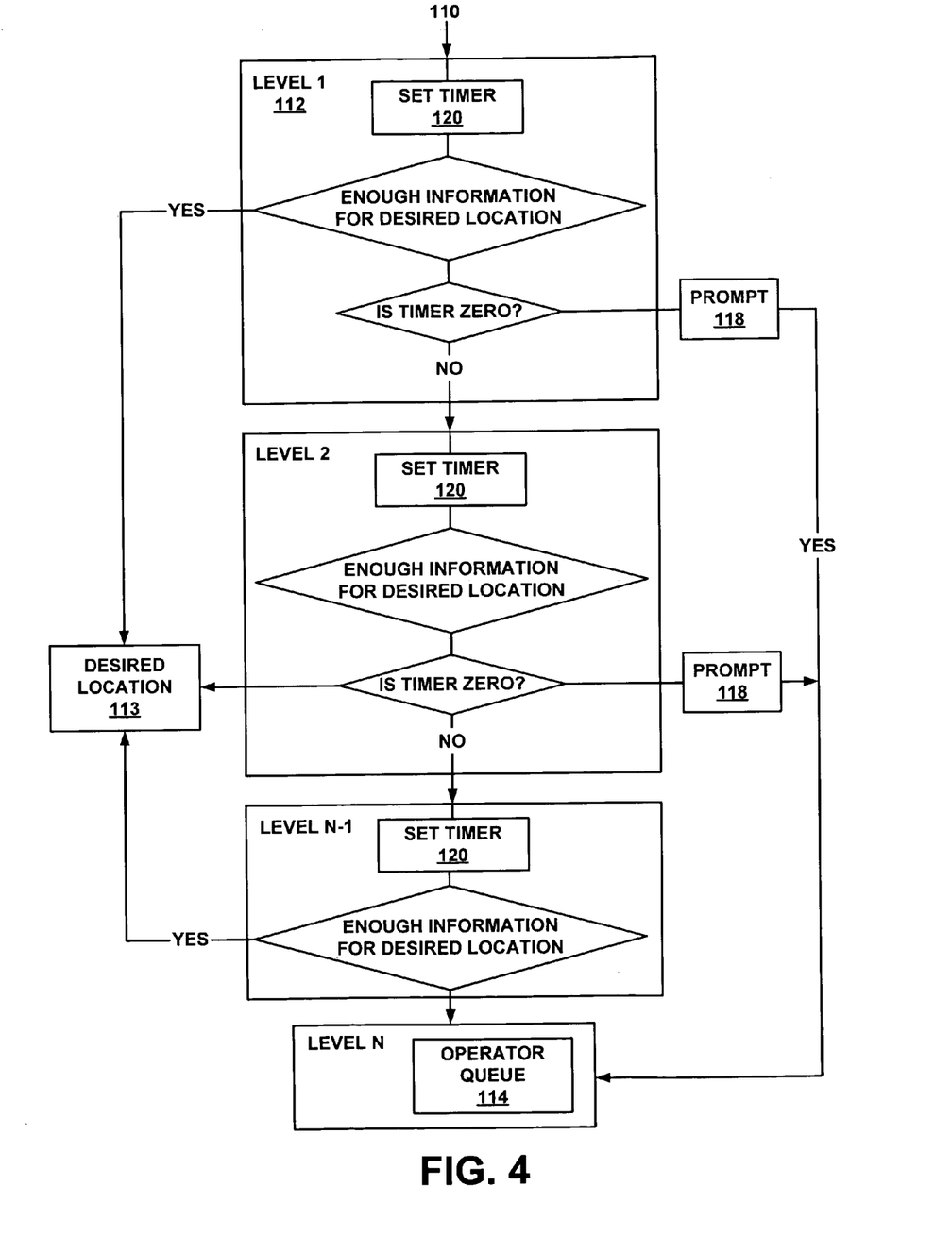
FIG. 4 is a block diagram/flow chart illustrating another embodiment of an IVR system of the present invention.

FIG. 4 illustrates another alternative exemplary embodiment of the present invention. FIG. 4 again broadly illustrates how the present invention may interact with a typical IVR system. In contrast to the IVR system of FIG. 3, the IVR system in FIG. 4 has timers 120 associated with each navigation level of the system. In this system the timers 120 start to decrement when the call 110 enters the navigation level. If the timer 120 expires before the call 110 leaves the navigation level, then a prompt 118 is initiated. The effect of prompt 118 can be varied including those effects discussed above.

While FIGS. 3 and 4 illustrate two potential embodiments of the present invention other variations may also be implemented. For example, the timers 120 may be associated with more than one but less than all of the navigation levels within the IVR system. Alternatively, there may be timers 120 associated with particular navigation points within a given navigation level. In addition, the system could be set up with multiple timers established at the time a call 110 enters the IVR system. Each timer 120 may be keyed to the occurrence of a particular event within the IVR system, such as entering or departing a particular navigation point or navigation level. This timer can be set for the same or different threshold times depending on the system and the event within the system. For example there may be a global timer that begins to decrement upon entry into the IVR system, establishing the maximum time the call will reside in the IVR system without potential system intervention. At the same time, there may be timers associated with other navigation points that could trigger system action before the global timer expires. It is further noted, that while the above embodiments of the invention are described with a decrementing timer, the invention includes systems designed to include an incrementing timer.

How the timer 116, 120 interacts with the IVR system is controlled by timer logic. The timer logic is associated with the navigation logic and is also preferably located on data storage. The timer logic may be integral to navigation logic or it may be a separate application that functionally interfaces with the navigation logic. Like the navigation logic the timer logic may be written or rendered in any appropriate language. The timer logic, however, should be compatible with the IVR system in which it is being employed and the navigation logic associated with that IVR system. The timer logic may include the timers 116, 120 discussed above and appropriate logic to associate these timers with the call 110. In addition, this timer logic will control how the IVR system reacts once a threshold time is reached. As noted above upon reaching the threshold time, the timer logic may issue a prompt to the IVR system. This prompt will direct the IVR system to analyze the status of the call within the system and address the call in an appropriate manner. As noted above, an appropriate response may vary from system to system and may include: forwarding the call to a live operator, forwarding the call to a call queue for a live operator, doing nothing with the call and resetting the timer, or inquiring of the caller if she would like to speak with a live operator.

The timer logic sets the timers 116, 120 to a predetermined threshold time. This threshold time may vary from system to system and may vary from call to call. Indeed, the threshold time may vary between different navigation points within a given IVR system wherein each navigation point may be a separate VoiceXML document. In IVR systems that employ multiple timers 20 the timer logic may have a table of times for setting each timer 120. There may be multiple tables to address multiple conditions that the IVR system may address. Similarly, these times may also be adjustable based upon the status of the system. For example, if the call queue for a live operator is especially long (i.e. exceeds a preset number of calls), then the threshold times may be enlarged so as not to transfer a call to a call queue that is too long.

In practice, the timer logic of the IVR system may have a table that specifies, per navigation point (i) a timer value and (ii) one or more other navigation points that should cause the IVR system to stop applying or reset the timer. When the call 110 reaches a given navigation point, the timer logic of the IVR system can then refer to the table to determine the applicable timer value and then begin decrementing the timer. If and when the call reaches one of the other specified navigation points, the timer logic of the IVR system could then stop decrementing the timer and if appropriate start another timer from the table. However, if the timer expires before the user reaches one of the other specified navigation points, then the IVR system may responsively move the user to a predefined destination such as a call queue for a live operator.

It is envisioned that there may be situations where it may be desired to give some callers preferential treatment. For example, it may be advantageous to provide better service to "preferred customers." For such customers the threshold time the threshold time set by the timer logic may be lower than that associated with other customers. In one embodiment, the timer logic is capable of identifying the caller, for example through analysis of caller identification information (ANI) associated with the call. This identity can be compared to a list of preferred customers and if the caller appears on the list, the threshold time can be adjusted appropriately by the timer logic. In this manner, preferred customers will spend less time in the IVR system before they reach a desired navigation point.

Exemplary embodiments of the present invention have been described above. Those skilled in the art will understand, however, that changes and modifications may be made to these embodiments without departing from the true scope and spirit of the invention, which is defined by the claims.

I claim:

1. An interactive voice response system comprising:
   a communication interface for engaging in voice-band communications with a user via a telephone connection;
   data storage;
   navigation logic stored in the data storage and defining a navigation structure through which the user can navigate to various navigation points by providing voice-band commands to the interactive voice response system via the communication interface; and
   timer logic stored in the data storage and executable by a processor (i) for determining that the user has been interacting with the interactive voice response system for a threshold period and (ii) for responsively switching the user over to a predefined destination,
   wherein the timer logic is further executable to select the threshold period based on an identity of the user.

2. The interactive voice response system of claim 1, wherein the communication interface comprises a speech recognition engine that translates speech received from the user into digital representations of navigation commands.

3. The interactive voice response system of claim 2, wherein the communication interface further comprises a text-to-speech engine that translates text prompts into speech prompts for transmission to the user.

4. The interactive voice response system of claim 1, wherein the telephone connection comprises a circuit-switched telephone connection.

5. The interactive voice response system of claim 1, wherein the telephone connection comprises a packet-switched telephone connection.

6. The interactive voice response system of claim 1, wherein the navigation logic comprises a Voice-XML markup document.

7. The interactive voice response system of claim 1, wherein the predefined destination is an operator queue.

8. The interactive voice response system of claim 1, wherein the predefined destination is a live operator.

9. The interactive voice response system of claim 1, wherein determining that the user has been interacting with the interactive voice response system for a threshold period comprises determining that the user has been interacting with an aspect of the navigation structure for the threshold period.

10. The interactive voice response system of claim 9, wherein the aspect of the navigation structure is a given navigation point in the navigation structure.

11. The interactive voice response system of claim 9, wherein the aspect of the navigation structure is a plurality of navigation points in the navigation structure.

12. The interactive voice response system of claim 1, wherein the threshold period begins when the user first calls the interactive voice response system.

13. The interactive voice response system of claim 1, wherein the timer logic is further executable to make a determination of whether the user is substantively interacting with the interactive voice response system, and wherein the timer logic performs the switching function only if the determination is that the user is not substantively interacting with the interactive voice response system.

14. An interactive voice response system comprising:
a communication interface for engaging in voice-band communications with a user via a telephone connection;
data storage;
navigation logic stored in the data storage and defining a navigation structure through which the user can navigate to various navigation points by providing voice-band commands to the interactive voice response system via the communication interface; and
timer logic stored in the data storage and executable by a processor (i) for malting a determination that the user has been interacting with the interactive voice response system for a threshold period and (ii) using the determination as a basis to switch the user over to a predefined destination,
wherein the timer logic is further executable to select the threshold period based on an identity of the user.

15. In an interactive voice response system including navigation logic stored in data storage and defining a navigation structure through which a user can navigate to various navigation points by providing voice-band commands to the interactive voice response system via a communication interface, a method comprising:
determining at an interactive voice response system that the user has been interacting with the interactive voice response system for a threshold period; and
responsively switching the user to a predefined communication destination,
wherein the timer logic is further executable to select the threshold period based on an identity of the user.

16. The method of claim 15, wherein the predefined communication destination is a given navigation point in the interactive voice response system.

17. The method of claim 15, wherein the predefined communication destination is a live operator.

18. The method of claim 15, wherein determining that the user has been interacting with the interactive voice response system for the threshold period comprises determining that the user has been interacting with an aspect of the interactive voice response system for the threshold period.

19. The method of claim 15, wherein determining that the user has been interacting with the interactive voice response system for the threshold period comprises determining that the user has been engaged in a session with the interactive voice response system for the threshold period.

\* \* \* \* \*

UNITED STATES PATENT AND TRADEMARK OFFICE
CERTIFICATE OF CORRECTION

PATENT NO. : 7,436,948 B1
APPLICATION NO. : 11/023770
DATED : October 14, 2008
INVENTOR(S) : Balaji S. Thenthiruperai

Page 1 of 1

It is certified that error appears in the above-identified patent and that said Letters Patent is hereby corrected as shown below:

Column 10, Line 4, please delete "malting" and add -- making --.

Signed and Sealed this

Seventeenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,436,948 B1
APPLICATION NO. : 11/023770
DATED : October 14, 2008
INVENTOR(S) : Balaji S. Thenthiruperai

It is certified that error appears in the above-identified patent and that said Letters Patent is hereby corrected as shown below:

On The Title Page:

Item [54] Title, please delete "Method and System for Timed Interaction with an Interactive Voice Response" and add -- Method and System for Timed Interaction with an Interactive Voice Response System --.

Signed and Sealed this

First Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,436,948 B1 Page 1 of 1
APPLICATION NO. : 11/023770
DATED : October 14, 2008
INVENTOR(S) : Balaji S. Thenthiruperai It is certified that error appears in the above-identified patent and that said Letters Patent is hereby corrected as shown below:

On The Title Page, Item (54) and at Column 1, lines 1-3,

Title, please delete "Method and System for Timed Interaction with an Interactive Voice Response" and add -- Method and System for Timed Interaction with an Interactive Voice Response System --.

This certificate supersedes the Certificate of Correction issued December 1, 2009.

Signed and Sealed this

Twenty-second Day of December, 2009

David J. Kappos
*Director of the United States Patent and Trademark Office*